United States Patent
Subramanyam

(10) Patent No.: US 9,499,446 B2
(45) Date of Patent: Nov. 22, 2016

(54) ZINC-ESSENTIAL FOR FLORA AND FAUNA

(71) Applicant: Sundaresan Subramanyam, Chennai (IN)

(72) Inventor: Sundaresan Subramanyam, Chennai (IN)

(*) Notice: Subject to any disclaimer, the term of this patent is extended or adjusted under 35 U.S.C. 154(b) by 0 days.

(21) Appl. No.: 14/426,886

(22) PCT Filed: Aug. 14, 2013

(86) PCT No.: PCT/IN2013/000499
§ 371 (c)(1),
(2) Date: Mar. 9, 2015

(87) PCT Pub. No.: WO2014/041556
PCT Pub. Date: Mar. 20, 2014

(65) Prior Publication Data
US 2015/0239787 A1    Aug. 27, 2015

(30) Foreign Application Priority Data
Sep. 12, 2012 (IN) .......................... 3789/CHE/2012

(51) Int. Cl.
*C05B 17/00* (2006.01)
*C05D 9/02* (2006.01)

(52) U.S. Cl.
CPC ................ *C05B 17/00* (2013.01); *C05D 9/02* (2013.01)

(58) Field of Classification Search
CPC .......... C05B 17/00; C05D 9/02; C05D 9/00; C05D 3/00; C05D 1/00; A01N 43/90; A01N 25/32; C05G 3/007; C05G 3/0005; C05F 11/02; C05C 3/00
See application file for complete search history.

(56) References Cited

U.S. PATENT DOCUMENTS

| 3,620,708 A | | 11/1971 | Ott |
| 5,021,077 A | * | 6/1991 | Moore .................. A23K 1/106 426/285 |
| 6,063,289 A | * | 5/2000 | Failon ...................... C02F 5/14 210/699 |

OTHER PUBLICATIONS

HEDP Trade Info [online] Jing Xin (China), Mar. 11, 2012, Download: http://jijing-chem.en.made-in-china.com/product/veMmtqZoMwhP/China-HEDP-1-HYDROXY-Ethylidene-1-1-Disphosphonic-Acid.html [Downloaded: Mar. 2, 2015].
HEDP: 1-Hydroxy Ethylidene-1, 1-Diphosphonic Acid. Trade Info [online] SHR, Jining City Shandong Province China, Mar. 3, 2012. Download: http://www.made-in-china.com/showroom/pbte-chemical/product-detailgbimMCpVZSYe/China-HEDP-1-Hydroxy-Ethylidene-1-1-Diphosphonic-Acid.html [Downloaded: Mar. 2, 2015].

(Continued)

*Primary Examiner* — Jennifer A Smith
(74) *Attorney, Agent, or Firm* — Innovation Capital Law Group, LLP; Vic Lin

(57) ABSTRACT

The present invention relates to a chelated fertilizer composition for enriching Zinc and Phosphorus content in agriculture/horticulture crops and plants through foliar application. The chelated fertilizer composition can be prepared using compounds comprising (a) Na2 HEDP and ZnSO4.H2O (Zinc sulphate monohydrate) and (b) Na2 HEDP and ZnO (Zinc Oxide). The chelation of Zn by Na2 HEDP using ZnSO4.H2O developed 17% Zn-HEDP and 21% Phosphorus pentoxide (P2O5) and chelation of Zn by Na2 HEDP using ZnO developed 21% Zn-HEDP and 26% P2O5. The chelated fertilizer composition obtained is in powder form and is 100% water-soluble concentrate. The chelated fertilizer composition can be used to cure Zinc and Phosphorus deficiency in crops and plants, increase yield with more Zinc and Phosphorus content, thus reducing the risk of Zinc and Phosphorus deficiency in humans.

2 Claims, 2 Drawing Sheets

(56) References Cited

OTHER PUBLICATIONS

Figure 1:
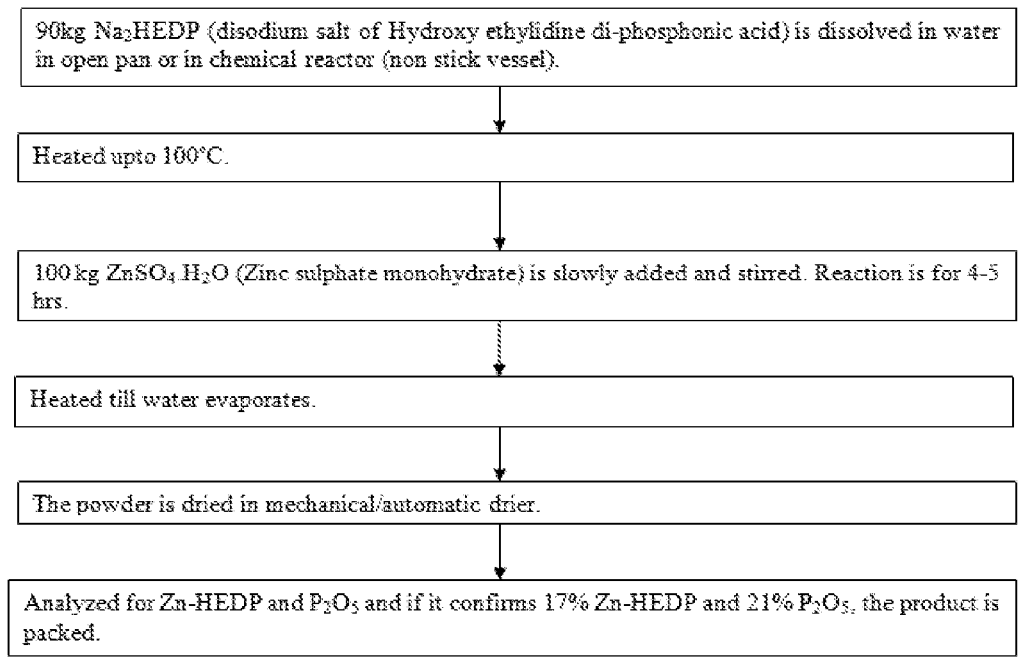

Zinc in Fertilizer: Options to consider [online information]; International Zinc Association; Download: www.zinc.org/crops; http://www.zinc.org/crops/resourceserve/zinc_in_fertilizers_options_to_consider [Downloaded: Mar. 6, 2015].

Zinc Fact Sheets: Zinc Fertilizer [online information]; International Zinc Association; Download: http://www.zinc.org/crops/resourceserve/zinc_fact_sheets_fertilizer_faqs [Down loaded: Mar. 6, 2015].

International Search Report (mailing date Nov. 22, 2013) for International PCT Application PCT/IN2013/000499, filed Aug. 14, 2013.

* cited by examiner

ZINC-ESSENTIAL FOR FLORA AND FAUNA

FIELD OF INVENTION

The present invention relates to a chelated fertilizer composition for agriculture/horticulture crops and plants. More specifically, the present invention relates to a chelated fertilizer composition for enriching Zinc and Phosphorus content in crops and plants through foliar application. Further, the present invention relates to a method of preparing the chelated fertilizer composition. The chelated fertilizer composition can be used to cure Zinc and Phosphorus deficiency in crops and plants, increase yield with more Zinc and Phosphorus content, thus reducing the risk of Zinc and Phosphorus deficiency in humans.

DESCRIPTION OF PRIOR ART

Zinc (Zn) is an essential micronutrient in crop/plant production and is used in many fertilizers. Some soil can supply the adequate amount of zinc to plants. In other cases where Zn exists in the soil in an unavailable form or the soil is Zn deficient, Zn fertilizers may be added to the soil to enrich soil fertility. Plants vary considerably in their requirement for Zn. Zn is an important component of various metallo enzymes such as carbonic anhydrase, alcohol dehydrogenase etc that are responsible for driving various metabolic reactions in plants. Zn is essential for the biosynthesis of the plant hormone indole acetic acid (IAA). Zn also plays a role in nucleic acid, protein synthesis and helps in the utilization of phosphorus and nitrogen in plants. Absence of Zn can affect growth and development in plants. Plants deficient in Zn show certain characteristic deficiency symptoms that may last through the entire growth season.

Though required in small quantities, Zn is also very essential for humans. Plant sources for Zn include cereals, nuts, legumes, soy products etc. In humans, Zn deficiency can cause appearance of white spots on nails, skin lesions, acne, diarrhea, wasting of body tissues etc. Zn plays an essential role in eyesight, taste, smell and memory. Deficiency in Zn can cause malfunctions of these organs and functions. Zn is an essential component in many enzymes and influences hormones. Zn also accelerates cell division and enhances the immune system. Congenital abnormalities causing Zn deficiency may lead to a disease called acrodermatitis enteropathica, a metabolic disorder affecting the uptake of Zn. Enriching plants used as food source with Zn helps to combat Zn deficiency in humans.

The importance of Zn has lead to the research in use of Zn in the sequestered form. Normally, cationic nutrients are fixed by anions. This leads to chelation i.e., sequestering. Once chelated, fixation and unwanted reaction will not affect. The chelation process will enable the nutrients to move freely inside the plants. Known in Prior Art is chelation of Zn using Ethylene diamine tetra acetic acid (EDTA) to give Zn EDTA. This sequestered form of Zn is used in agriculture as a micronutrient for plant growth. However, Zn EDTA gives only 12% Zn.

U.S. Pat. No. 5,047,078 describes a fertilizer composition comprising a phosphate fertilizer and a kale inhibiting compound that helps to increase plant growth and yield.

US20110098177 relates to a method of providing a metal to a plant to increase the yield.

US20030101785 describes micronutrient compositions having chelated metal ions. The chelating agents used are amino phosphonic acids.

US20080293570 describes a method of sequestering micronutrients to provide the micronutrients to a plant.

AU2006200467 relates to micronutrient chelate fertilizers and methods for preparing the same.

Accordingly, there exist a need for a fertilizer composition for improving the nutrient content in crops and plants, thereby overcoming the problems associated with nutrient deficiencies.

OBJECTS OF INVENTION

The primary object of the present invention is directed to provide a chelated fertilizer composition for agriculture/horticulture crops and plants.

It is another object of the present invention to provide a chelated fertilizer composition for enriching Zinc (Zn) and Phosphorus (P) content in crops and plants through foliar application.

It is another object of the present invention to provide a method of preparing the chelated fertilizer composition.

It is another object of the present invention, wherein the chelated fertilizer composition is used to cure Zn and P deficiency in crops and plants, increase yield with more Zn and P content, thus reducing the risk of Zn and P deficiency in humans.

It is another object of the present invention, wherein sequestration of Zn is done using a chelating agent—disodium salt of Hydroxy Ethylidene Di Phosphonic Acid ($Na_2$ HEDP).

It is another object of the present invention, wherein the chelated fertilizer composition can be prepared using compounds comprising $Na_2$ HEDP and $ZnSO_4.H_2O$ (Zinc sulphate monohydrate).

It is another object of the present invention, wherein the chelated fertilizer composition can be prepared using compounds comprising $Na_2$ HEDP and ZnO (Zinc Oxide).

It is another object of the present invention, wherein chelation of Zn by $Na_2$ HEDP using $ZnSO_4.H_2O$ developed 17% Zn-HEDP and 21% Phosphorus pentoxide ($P_2O_5$).

It is another object of the present invention, wherein chelation of Zn by $Na_2$ HEDP using ZnO developed 21% Zn-HEDP and 26% $P_2O_5$.

It is another object of the present invention, wherein the Zn-HEDP increases the yield upto 27% and the Zn content is increased upto 85% in Grains compared to control.

It is another object of the present invention, wherein the $P_2O_5$ increases the yield and Phosphorous concentration of crops and plants.

It is another object of the present invention, wherein the chelated fertilizer composition obtained is in powder form and is 100% water-soluble concentrate.

SUMMARY OF INVENTION

Thus according to the basic aspect of the present invention, there is provided a chelated fertilizer composition for use as a foliar fertilizer for enrichment of Zinc (Zn) and Phosphorus (P) in crops and plants comprising:
  Zinc (Zn) chelate; and
  Phosphorus pentoxide ($P_2O_5$),
  wherein the Zinc chelate is Zn-Hydroxy Ethylidene Di Phosphonic Acid (HEDP), and
  wherein the chelated fertilizer composition is in powder form and is 100% water soluble concentrate.

A further aspect of the present invention is directed to provide a chelated fertilizer composition, wherein the fertilizer composition is prepared using compounds comprising:
  Chelating agent; and
  Zinc sulphate monohydrate ($ZnSO_4.H_2O$), wherein the chelating agent is disodium salt of Hydroxy Ethylidene Di Phosphonic Acid ($Na_2$ HEDP).

A further aspect of the present invention is directed to provide a chelated fertilizer composition, wherein the fertilizer composition is prepared using compounds comprising:
Chelating agent; and
ZnO (Zinc Oxide),
wherein the chelating agent is disodium salt of Hydroxy Ethylidene Di Phosphonic Acid ($Na_2$ HEDP).

It is another aspect of the present invention, wherein the Zinc chelate (Zn-Hydroxy Ethylidene Di Phosphonic Acid) is obtained by sequestration of Zinc (Zn) using the chelating agent.

It is another aspect of the present invention, wherein the chelated fertilizer composition in powder form contains 17% Zn-HEDP and 21% $P_2O_5$ by weight of the composition.

It is another aspect of the present invention, wherein the chelated fertilizer composition in powder form contains 21% Zn-HEDP and 26% $P_2O_5$ by weight of the composition.

It is another aspect of the present invention, wherein pH of the chelated fertilizer composition is between 3.5 and 4.5.

A further aspect of the present invention is directed to provide a process for preparing the chelated fertilizer composition using compounds comprising disodium salt of Hydroxy Ethylidene Di Phosphonic Acid ($Na_2$ HEDP) and $ZnSO_4.H_2O$ (Zinc sulphate monohydrate), comprising the steps of:
Dissolving $Na_2$ HEDP in water;
Heating the dissolved mixture up to 100° C. in a non-stick temperature controlled vessel/reactor;
Adding $ZnSO_4.H_2O$ slowly and stirring to obtain mixture containing Zn-HEDP and $P_2O_5$;
Maintaining the temperature at 100° C. and stirring the mixture until liquid portion evaporates; and
Drying the composition thus obtained using drier to secure moisture free powder composition containing 17% Zn-HEDP and 21% $P_2O_5$,
wherein the chelated fertilizer composition is in powder form and is 100% water soluble concentrate.

A further aspect of the present invention is directed to provide a process for preparing the chelated fertilizer composition using compounds comprising disodium salt of Hydroxy Ethylidene Di Phosphonic Acid ($Na_2$ HEDP) and ZnO (Zinc Oxide), comprising the steps of:
Dissolving $Na_2$ HEDP in water;
Heating the dissolved mixture up to 100° C. in a non-stick temperature controlled vessel/reactor;
Adding ZnO slowly and stirring to obtain mixture containing Zn-HEDP and $P_2O_5$;
Maintaining the temperature at 100° C. and stirring the mixture until liquid portion evaporates;
Drying the composition thus obtained using drier to secure moisture free powder composition containing 23% Zn-HEDP and 29% $P_2O_5$;
Adding 10% dispersal powder; and
Mixing in blender to obtain 21% Zn-HEDP and 26% $P_2O_5$,
wherein the chelated fertilizer composition is in powder form and is 100% water soluble concentrate.

BRIEF DESCRIPTION OF THE FLOWCHARTS

FIG. 1 is a flowchart illustrating the process for preparing the chelated fertilizer composition using $Na_2$ HEDP and $ZnSO_4.H_2O$.

FIG. 1 is a flowchart illustrating the process for preparing the chelated fertilizer composition using $Na_2$ HEDP and ZnO.

DETAILED DESCRIPTION OF THE INVENTION WITH REFERENCE TO THE ACCOMPANYING DRAWINGS

The present invention relates to a chelated fertilizer composition for agriculture/horticulture crops and plants, and a method of preparing the chelated fertilizer composition. The present invention provides a chelated fertilizer composition for enriching Zinc (Zn) and Phosphorus (P) content in crops and plants through foliar application. Zn-HEDP increases the yield up to 27% and the Zn content is increased up to 85% in grains compared to control.

The chelated fertilizer composition is used to cure Zn and P deficiency in crops and plants, increase yield with more Zn and P content, thus reducing the risk of Zn and P deficiency in humans. The sequestration of Zn is done using a chelating agent—disodium salt of Hydroxy Ethylidene Di Phosphonic Acid ($Na_2$ HEDP). The chelated fertilizer composition can be prepared using either compounds comprising $Na_2$ HEDP and $ZnSO_4.H_2O$ (Zinc sulphate monohydrate), or compounds comprising $Na_2$ HEDP and ZnO (Zinc Oxide). The Zn chelate increases the yield and Zn concentration and $P_2O_5$ increases the yield and Phosphorous concentration of crops and plants.

In one embodiment of the present invention, the chelated fertilizer composition is obtained using. $Na_2$ HEDP and $ZnSO_4.H_2O$, heated at 100° C. to give 17% Zn-HEDP and 21% $P_2O_5$ in powder form as shown below. The chelated fertilizer composition thus obtained is completely soluble.

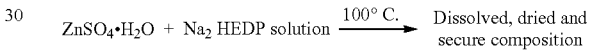

$ZnSO_4·H_2O + Na_2$ HEDP solution $\xrightarrow{100°C.}$ Dissolved, dried and secure composition The process of preparing the chelated fertilizer composition as illustrated in the flow chart of FIG. 1 using $Na_2$ HEDP and $ZnSO_4.H_2O$ comprises dissolving 90 Kg $Na_2$ HEDP in water. 90 Kg $Na_2$ HEDP contains 40.89 gram $P_2O_5$. The dissolved mixture is heated up to 100° C. in a non-stick temperature controlled vessel/reactor or open pan. Further 100 Kg $ZnSO_4.H_2O$ containing 33 gram Zn is slowly added and the mixture is stirred. During this process, the temperature is maintained at 100° C. and the mixture stirred for 4-5 hours until the liquid portion evaporates. The composition thus obtained is dried using mechanical/automatic drier to secure moisture free powder containing 17% Zn HEDP and 21% $P_2O_5$. Chelation makes the composition completely soluble. The composition is analyzed and packed for market. The pH of the chelated fertilizer composition is between 3.5 and 4.5.

Lab Grade $ZnSO_4.H_2O$—2.27 gm Zinc—5 gm 100% HEDP,
whereas in prior art:
Lab Grade $ZnSO_4.H_2O$—2.27 gm Zinc—11.13 gm EDTA The method of preparing the chelated fertilizer composition using $Na_e$ HEDP and $ZnSO_4.H_2O$ is summarized as follows:

HEDP 100%-2.27 gm Zinc—5 gm
$Na_2$HEDP 80%-2.27 gm Zinc—6.25 gm
2.27 gm Zinc-6.25 gm $Na_2$HEDP

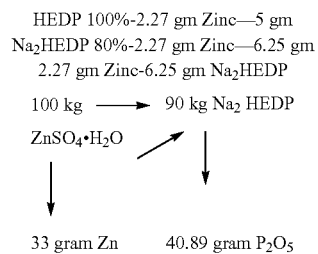

100 kg ⟶ 90 kg $Na_2$ HEDP
$ZnSO_4·H_2O$ 33 gram Zn    40.89 gram $P_2O_5$

-continued

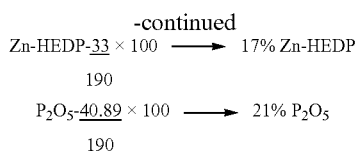

In another embodiment of the present invention, the chelated fertilizer composition is obtained using $Na_2$ HEDP and ZnO, heated at 100° C. to give 21% Zn-HEDP and 26% $P_2O_5$ in powder form as shown below. The chelated fertilizer composition thus obtained is completely soluble.

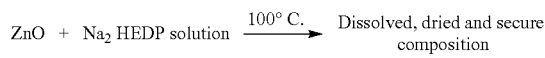

Figure 2:
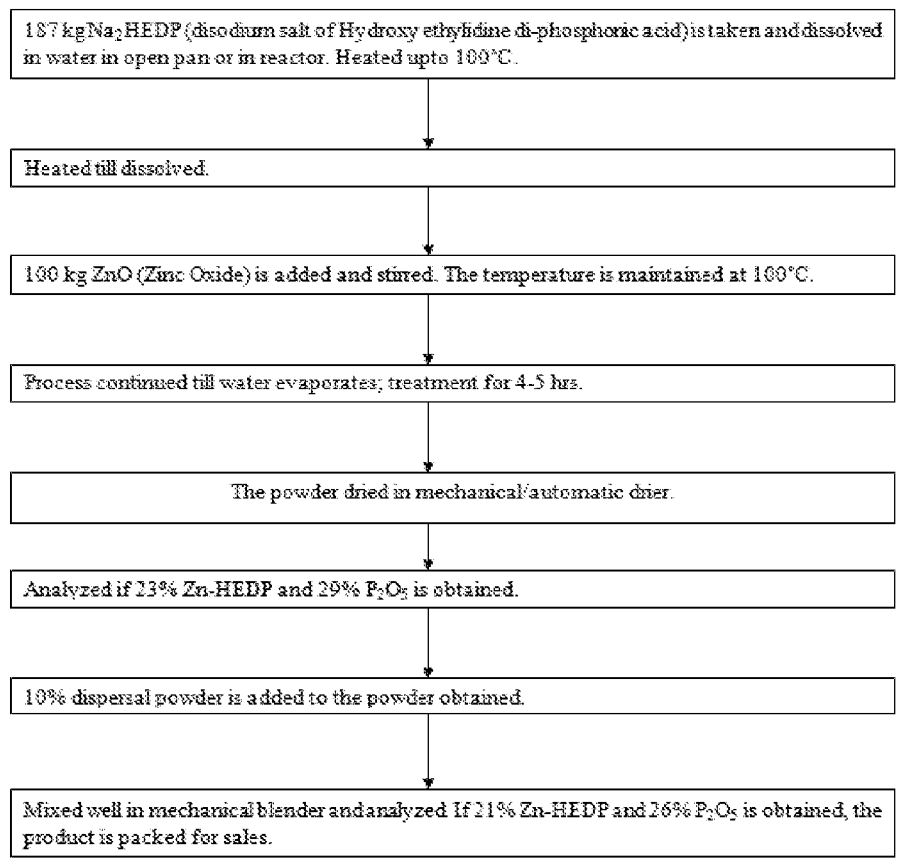

The process of preparing the chelated fertilizer composition as illustrated in the flow chart of FIG. 2 using $Na_2$ HEDP and ZnO comprises dissolving 187 Kg $Na_2$ HEDP in water. 187 Kg $Na_2$ HEDP contains 85 Kg $P_2O_5$. The dissolved mixture is heated up to 100° C. in a non-stick temperature controlled vessel/reactor or open pan. Further, 100 Kg ZnO containing 68 Kg Zn is slowly added and the mixture is stirred. During this process, the temperature is maintained at 100° C. and the mixture stirred for 4-5 hours until the liquid portion evaporates. The composition thus obtained is dried using mechanical/automatic drier to secure moisture free powder containing 23% Zn-HEDP and 29% $P_2O_5$. 10% dispersal powder is added and mixed well in mechanical blender to obtain 21% Zn-HEDP and 26% $P_2O_5$. Chelation makes the composition completely soluble. The composition is analyzed and packed for market. The pH of the chelated fertilizer composition is between 3.5 and 4.5.

The method of preparing the chelated fertilizer composition using $Na_2$ HEDP and ZnO is summarized as follows:
2.27 gm Zinc needs 5 gm 100% HEDP
2.27 gm Zinc needs 6.25 gm $Na_2$ HEDP

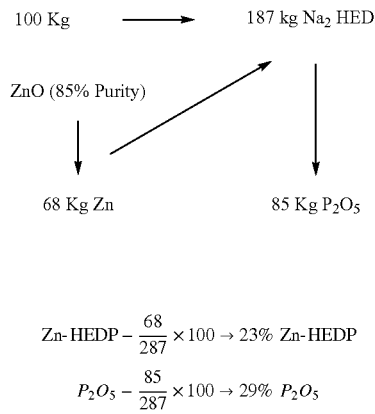

The chelated fertilizer composition Obtained by adding 10% dispersal is

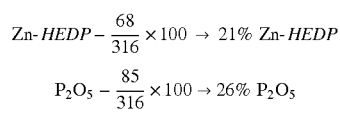

Various field experiments were conducted to study the effect of Zn-HEDP chelate on plants.

Experiment I

Field Experiments in wheat was carried out using the composition of the present invention for two consecutive years in Punjab Agriculture University (PAU) Research Farm and Framer's field (Jattpur) loamy soil. Wheat cultivar PBW 550 seeds were sown during the first week of November. Two Zn chelates at different concentrations at two stages of wheat plant growth were applied through foliar application. In another treatment, Zn was added to the soil as basal dose at 62.5 kg $ha^{-1}$ using $ZnSO_4.7H_2O$ salt. The first application of Zn chelate spray was done at maximum tillering stage and the second application was made at panicle initiation stage. The different treatments are shown in Table 1. Various parameters like plant height, tillers and 1000-grain weight were noted. Additionally during maturity in the month of April, the wheat grain and straw yield were noted.

TABLE 1

Different Zinc chelate treatments used for the above experiment

| Treatments | Name of Chemical/Chelate | Concentration of Chemical/Chelate |
|---|---|---|
| $T_1$ | $ZnSO_4 \cdot 7H_2O$ (soil application) | 62.5 kg $ha^{-1}$ |
| $T_2$ | Zn HEDP (C) (foliar spray) | 2 gram $liter^{-1}$ |
| $T_3$ | Zn HEDP (C) (foliar spray) | 3 gram $liter^{-1}$ |
| $T_4$ | Zn HEDP (L) (foliar spray) | 2 gram $liter^{-1}$ |
| $T_5$ | Zn HEDP (L) (foliar spray) | 3 gram $liter^{-1}$ |
| $T_6$ | No Zn (Control) | Nil |

The physio-chemical analyses of the soil before the start of the experiment was carried out at the two locations were the experiments were to be carried. The soil properties of the experimental fields before the start of the experiment are shown in Table 2.

TABLE 2

Soil properties of the experimental fields before the start of the experiment

| | Soil Properties Texture | |
|---|---|---|
| | PAU research farm sandy loam | Farmer's field (Jattpur) loamy sand |
| pH (1:2:: soil:water) | 7.5 | 7.8 |
| Electric Conductivity (dS $m^{-1}$) | 0.16 | 0.12 |
| Organic Carbon (%) | 0.46 | 0.30 |
| Available Nitrogen (kg $ha^{-1}$) | 280 | 240 |
| Available Phosphorus (kg $ha^{-1}$) | 18.0 | 15.4 |
| Available Potassium (kg $ha^{-1}$) | 285 | 260 |
| Available Zinc (mg $kg^{-1}$) | 0.86 | 0.52 |

The plant parameters in wheat under different Zn treatments at PAU research farm and farmer's field are shown in Table 3 and Table 4 respectively and grain and straw yields in wheat under different Zn treatments at PAU research farm and farmer's field are shown in Table 5 and Table 6 respectively.

TABLE 3

Plant parameters in wheat under different Zn treatments at PAU research farm

| | Rabi 2009-2010 | | | Rabi 2010-2011 | | |
|---|---|---|---|---|---|---|
| Treatment | Plant height (cm) | Tillers per square meter | 1000 grains weight (g) | Plant height (cm) | Tillers per square meter | 1000 grains weight (g) |
| $T_1$ | 76.7 | 293 | 38.4 | 97.69 | 377 | 38.7 |
| $T_2$ | 76.1 | 291 | 36.8 | 95.23 | 372 | 36.9 |
| $T_3$ | 77.4 | 294 | 38.4 | 96.20 | 381 | 39.2 |
| $T_4$ | 79.6 | 287 | 37.6 | 95.90 | 373 | 38.1 |
| $T_5$ | 78.0 | 295 | 38.7 | 96.81 | 383 | 39.8 |
| $T_6$ | 74.2 | 275 | 34.4 | 93.65 | 357 | 35.5 |
| Mean | 76.9 | 289 | 37.4 | 95.91 | 373 | 38.0 |
| CD (0.05) | 4.2 | 9.5 | 2.9 | NS | NS | 2.51 |

TABLE 4

Plant parameters in wheat under different Zn treatments at farmer's field

| | Rabi 2009-2010 | | | Rabi 2010-2011 | | |
|---|---|---|---|---|---|---|
| Treatment | Plant height (cm) | Tillers per square meter | 1000 grains weight (g) | Plant height (cm) | Tillers per square meter | 1000 grains weight (g) |
| $T_1$ | 76.6 | 272 | 35.1 | 74.7 | 353 | 34.3 |
| $T_2$ | 71.9 | 254 | 34.9 | 68.1 | 320 | 33.4 |
| $T_3$ | 75.9 | 255 | 33.9 | 73.3 | 333 | 33.8 |
| $T_4$ | 76.2 | 261 | 33.7 | 69.9 | 318 | 32.7 |
| $T_5$ | 73.6 | 266 | 33.3 | 70.7 | 340 | 33.2 |
| $T_6$ | 72.0 | 248 | 31.1 | 66.7 | 290 | 30.8 |
| Mean | 74.4 | 259 | 33.7 | 70.6 | 326 | 33.0 |
| CD (0.05) | 4.0 | 10.1 | 1.9 | 4.02 | 6.28 | 0.75 |

TABLE 5

Grain and Straw yields (q ha$^{-1}$) in wheat under different Zn treatments at PAU research farm

| | Rabi 2009-2010 | | | | Rabi 2010-2011 | | | |
|---|---|---|---|---|---|---|---|---|
| Treatments | Grain | % increase over control | Straw | % increase over control | Grain | % increase over control | Straw | % increase over control |
| $T_1$ | 52.5 | 10.8 | 65.0 | 3.7 | 54.4 | 13.3 | 65.7 | 5.5 |
| $T_2$ | 51.0 | 7.6 | 65.4 | 4.3 | 50.5 | 5.2 | 66.9 | 7.4 |
| $T_3$ | 51.2 | 8.0 | 67.6 | 7.8 | 51.5 | 7.3 | 69.6 | 11.7 |
| $T_4$ | 48.8 | 3.0 | 64.6 | 3.0 | 52.2 | 8.8 | 73.9 | 18.6 |
| $T_5$ | 52.0 | 9.7 | 66.7 | 6.4 | 53.4 | 11.3 | 74.1 | 18.9 |
| $T_6$ | 47.4 | 0.0 | 62.7 | 0.0 | 48.0 | 0.0 | 62.3 | 0.0 |
| Mean | 50.5 | 6.5 | 65.3 | 4.2 | 51.7 | 7.6 | 68.8 | 10.4 |
| CD (0.05) | 3.6 | — | 4.4 | — | 2.90 | — | NS | — |

TABLE 6

Grain and Straw yields (q ha$^{-1}$) in wheat under different Zn treatments at farmer's field

| | Rabi 2009-2010 | | | | Rabi 2010-2011 | | | |
|---|---|---|---|---|---|---|---|---|
| Treatments | Grain | % increase over control | Straw | % increase over control | Grain | % increase over control | Straw | % increase over control |
| $T_1$ | 46.7 | 28.7 | 55.3 | 9.1 | 46.0 | 28.5 | 54.7 | 20.8 |
| $T_2$ | 45.0 | 24.0 | 56.0 | 10.5 | 43.2 | 20.7 | 48.5 | 7.1 |
| $T_3$ | 46.0 | 26.7 | 58.3 | 15.0 | 44.7 | 24.9 | 50.3 | 11.0 |
| $T_4$ | 44.3 | 22.0 | 52.3 | 3.2 | 43.0 | 20.1 | 49.3 | 8.8 |
| $T_5$ | 46.3 | 27.5 | 59.0 | 16.4 | 45.6 | 27.4 | 52.5 | 15.9 |
| $T_6$ | 36.3 | 0.0 | 50.7 | 0.0 | 35.8 | 0.0 | 45.3 | 0.0 |
| Mean | 44.1 | 21.5 | 55.3 | 9.0 | 43.1 | 20.3 | 50.1 | 10.6 |
| CD (0.05) | 2.52 | — | 2.37 | — | 2.25 | — | NS | — |

Experiment II

Field Experiments in wheat was carried out using the composition of the present invention in the soils of the irrigated north-west plain zone of Rajasthan. The soils of north-west plain zone are deficient in zinc and poor growth or deficiency symptoms appear on the wheat crops. The different treatments used for Experiment II are shown in Table 7. Two foliar sprays were applied. First, during the vegetative growth stage on early appearance of the deficiency symptoms and the second foliar spray during the flag leaf initiation stage of the wheat crop.

TABLE 7

Different Zinc chelate treatments used for experiment II

| TREATMENTS | NAME OF CHEMICAL/ CHELATE | CONCENTRATION OF CHEMICAL/CHELATE |
|---|---|---|
| $T_1$ | No Zn (Control) | Nil |
| $T_2$ | Zn HEDP (C) (foliar spray) | 2 gram liter$^{-1}$ of water |
| $T_3$ | Zn HEDP (C) (foliar spray) | 3 gram liter$^{-1}$ of water |
| $T_4$ | Zn HEDP (L) (foliar spray) | 2 gram liter$^{-1}$ of water |
| $T_5$ | Zn HEDP (L) (foliar spray) | 3 gram liter$^{-1}$ of water |
| $T_6$ | ZnSO$_4$ | 24 kg ha$^{-1}$ |

The soil of the irrigated north-west plain zone of Rajasthan has a pH, of 8.27 and electric conductivity was 0.20 dS$^{-m}$. The soil has an organic carbon content of 0.23%, which is low, medium in available $P_2O_5$ i.e. 25.0 kg ha$^{-1}$ and high in available $K_2O$ i.e. 250 kg ha$^{-1}$. The diethylene triamine pentaacetic acid (DTPA) extractable zinc concentration in the soil was low. The wheat grain and straw yield were increased with the foliar application of Zn chelate at lower concentration Zn-HEDP (C) −2 gram liter$^{-1}$ of water. Other ancillary characters such as tillering and ear length significantly increased over the control treatment as shown in Table 8. The foliar application significantly increased thousand grain weights over the control treatment.

TABLE 8

Effect of the Zn chelate on yield and ancillary parameters of wheat crops

| | Yield (tonne ha$^{-1}$) | | No. of tillers m$^{-1}$ row | 1000 Grain weight (g) | Ear length (cm) | Zn conc (mg kg$^{-1}$) |
|---|---|---|---|---|---|---|
| Treatments | Grain | Straw | length | | | |
| $T_1$ | 4.13 | 5.20 | 112 | 35.60 | 9.28 | 23.50 |
| $T_2$ | 4.56 | 6.61 | 123 | 40.53 | 10.10 | 38.25 |
| $T_3$ | 4.50 | 6.52 | 115 | 38.43 | 9.93 | 32.00 |
| $T_4$ | 4.34 | 6.80 | 117 | 40.05 | 10.43 | 31.50 |
| $T_5$ | 4.42 | 6.58 | 116 | 39.68 | 10.08 | 30.50 |
| $T_6$ | 4.57 | 6.61 | 122 | 39.73 | 10.18 | 30.25 |
| SEM | 0.10 | 0.25 | 2.95 | 1.08 | 0.19 | 2.20 |
| C.D. at 5% | 0.31 | 0.74 | 8.88 | 3.25 | 0.58 | 6.60 |

Experiment III

Field experiments in transplanted rice were carried out using the composition of the present invention in Krishna-Godavari zone of Coastal Andhra Pradesh during rabi, 2008-2009. The climate conditions prevailing in this region are tropical, subtropical, humid to sub humid climate. The composition of the present invention (Zn-HEDP) was applied at two levels i.e. at 1 g and 2 g per liter to be sprayed at three stages 20, 40 and 60 days after transplanting rice crop. The prior art composition Zn-EDTA is also compared at similar doses of 1 g and 2 g in one liter water and also sprayed at 20, 40 and 60 days. Table 9 shows the effect of the above Zn compositions on rice grain and straw yields and Table 10 shows the effect of zinc compositions on yield components of rice.

TABLE 9

Effect of Zn compositions on rice grain and straw yields

| S. No | Treatment | Plant ht. (cm) | Grain yield (kg/ha) | Straw yield (kg/ha) | Total biomass (kg/ha) |
|---|---|---|---|---|---|
| T1 | Zn HEDP @ 1 g/lt. | 91.30 | 5717 | 4816.5 | 10558 |
| T2 | Zn HEDP @ 2 g/lt. | 97.28 | 6005 | 5287.5 | 11210 |
| T3 | Zn EDTA @ 1 g/lt. | 90.80 | 5630 | 4895.5 | 10405 |
| T4 | Zn EDTA @ 2 g/lt. | 94.80 | 5861 | 5044.5 | 10939 |
| T5 | Control (No Zn) | 86.48 | 5090 | 4303.0 | 9593 |
| SED | | 2.47 | 173.29 | 178.86 | 290.65 |
| CD$_{5\%}$ | | 7.44 | 522.23 | 539.01 | 875.92 |
| CV (%) | | 4.64 | 5.30 | 6.36 | 4.78 |

TABLE 10

Effect of zinc compositions on yield components of rice

| S. No | Treatment | Prod. Tillers/ m$^2$ | Panicle Length (cm) | Panicle Wt (g) | Filled grains/ panicle | 1000 grain wt (g) |
|---|---|---|---|---|---|---|
| T1 | Zn HEDP @ 1 g/lt. | 395 | 22.2 | 2.60 | 107 | 24.7 |
| T2 | Zn HEDP @ 2 g/lt | 410 | 22.9 | 2.89 | 120 | 25.2 |
| T3 | Zn EDTA @ 1 g/lt. | 396 | 22.3 | 2.60 | 105 | 24.6 |
| T4 | Zn EDTA @ 2 g/lt. | 403 | 22.6 | 2.79 | 116 | 25.3 |
| T5 | Control (No Zn) | 363 | 21.2 | 2.14 | 94 | 22.8 |
| S.Ed | | 8.90 | 0.31 | 0.08 | 3.22 | 0.69 |
| CD$_{5\%}$ | | 26.81 | 0.95 | 0.25 | 9.69 | 2.09 |
| CV (%) | | 3.92 | 2.45 | 5.52 | 5.15 | 4.90 |

The above experiment showed that rice grain yield improved significantly with zinc (foliar) application at 20, 40 and 60 days after planting. Both the zinc compositions, Zn-HEDP and Zn-EDTA, improved the grain yield significantly compared to unsprayed control. Straw yield also responded similarly due to zinc compositions and doses. Plant height was significantly improved due to the higher dose of both Zn-HEDP and Zn-EDTA compositions compared to their lower dose and unsprayed check. Similarly, rice plant total biomass at both the doses of Zn-HEDP and higher dose of Zn-EDTA recorded significantly higher biomass compared to the lower dose of Zn-EDTA and the unsprayed check.

Productive tillers/m$^2$ panicle length and panicle weight were influenced in similar way as shown in Table 10. Zinc application irrespective of dose or composition improved productive tillers, panicle length and panicle weight significantly compared to unsprayed check. However, filled grain number per panicle and 1000-grain weight increased significantly with zinc application and with increasing dose with both the compositions.

The above results indicated that use of Zn-HEDP as foliar spray applied at 20, 40 and 60 DAT, improved rice yields significantly by positively influencing the yield parameters, viz. productive tillers/m$^2$, panicle length and weight, filled grains per panicle and 1000 grain weight.

The present invention may be embodied in other specific forms without departing from its spirit or essential characteristics. The described embodiments are to be considered in all respects only as illustrative and not restrictive. The details of the invention, its object and advantages explained hereinbefore is to be understood that the invention, as fully described herein is not intended to be limited by the objects mentioned herein.

I claim:

1. A process for preparing a chelated fertilizer composition using compounds comprising disodium salt of Hydroxy Ethylidene Di Phosphonic Acid ($Na_2$ HEDP) and $ZnSO_4.H_2O$ (Zinc sulphate monohydrate), comprising the steps of:
    dissolving $Na_2$ HEDP in water;
    heating the dissolved mixture up to 100° C. in a non-stick temperature controlled vessel/reactor;
    adding $ZnSO_4.H_2O$ and stirring to obtain mixture containing Zn-HEDP and $P_2O_5$;
    maintaining the temperature at 100° C. and stirring the mixture until liquid portion evaporates; and
    drying a composition thus obtained using drier to secure moisture free powder composition containing 17% Zn-HEDP and 21% $P_2O_5$.

2. A process for preparing a chelated fertilizer composition using compounds comprising disodium salt of Hydroxy Ethylidene Di Phosphonic Acid ($Na_2$ HEDP) and ZnO (Zinc Oxide), comprising the steps of:
    dissolving $Na_2$ HEDP in water;
    heating the dissolved mixture up to 100° C. in a non-stick temperature controlled vessel/reactor;
    adding ZnO and stirring to obtain mixture containing Zn-HEDP and $P_2O_5$;
    maintaining the temperature at 100° C. and stirring the mixture until liquid portion evaporates;
    drying a composition thus obtained using drier to secure moisture free powder composition containing 23% Zn-HEDP and 29% $P_2O_5$;
    adding 10% by weight dispersal powder; and
    mixing in blender to obtain 21% Zn-HEDP and 26% $P_2O_5$.

* * * * *